United States Patent
Bertrand et al.

(10) Patent No.: US 9,832,538 B2
(45) Date of Patent: Nov. 28, 2017

(54) SYNCHRONIZING BROADCAST TIMELINE METADATA

(71) Applicant: Cisco Technology Inc., San Jose, CA (US)

(72) Inventors: Laurent Bertrand, Twickenham (GB); Sanjeev Maheve, Karnataka (IN); Reuven Wachtfogel, Elazar (IL)

(73) Assignee: Cisco Technology, Inc., San Jose, CA (US)

( * ) Notice: Subject to any disclaimer, the term of this patent is extended or adjusted under 35 U.S.C. 154(b) by 321 days.

(21) Appl. No.: 14/445,614

(22) Filed: Jul. 29, 2014

(65) Prior Publication Data

US 2015/0365710 A1    Dec. 17, 2015

(30) Foreign Application Priority Data

Jun. 16, 2014 (IN) .......................... 1620/DEL/2014

(51) Int. Cl.
*G06F 7/00* (2006.01)
*G06F 17/00* (2006.01)
(Continued)

(52) U.S. Cl.
CPC ... *H04N 21/8133* (2013.01); *G06F 17/30575* (2013.01); *H04N 21/23418* (2013.01);
(Continued)

(58) Field of Classification Search
CPC .. H04N 21/84; H04N 21/266; H04N 21/8133; G06F 17/30575
(Continued)

(56) References Cited

U.S. PATENT DOCUMENTS 7,197,638 B1 *   3/2007   Grawrock ........... G06F 21/6218
                                                      705/51
7,725,431 B2    5/2010   Myllyla et al.
(Continued)

FOREIGN PATENT DOCUMENTS

EP          2738686 A1    6/2014
WO     WO 2009/042858 A1    4/2009

OTHER PUBLICATIONS

Aug. 25, 2015 ISR and Written Opinion of ISA for PCT/IB2015/054509.
(Continued)

*Primary Examiner* — Usmaan Saeed
*Assistant Examiner* — Brian E. Weinrich
(74) *Attorney, Agent, or Firm* — Samuel M. Katz

(57) ABSTRACT

There are instances of a content item having synchronization information, one being an instance of a reference content item, another being a candidate content item. A synchronizing processor determines a synchronization point between the reference content item and the candidate content item, on the basis of matching the synchronization information of the reference content item and the candidate content item. A timeline metadata transmitter transmits stored timeline metadata to a device on which the reference content item is playing, the transmission of the stored timeline metadata beginning from the synchronization point. The stored timeline metadata includes timeline metadata that has been previously aggregated from earlier broadcasts of instances of the reference content item. Related systems, apparatus, and methods are also described.

20 Claims, 4 Drawing Sheets

(51) Int. Cl.
*G06F 17/30* (2006.01)
*H04N 21/81* (2011.01)
*H04N 21/242* (2011.01)
*H04N 21/266* (2011.01)
*H04N 21/234* (2011.01)
*H04N 21/2343* (2011.01)
*H04N 21/43* (2011.01)
*H04N 21/84* (2011.01)
*H04N 21/462* (2011.01)
*G06F 15/16* (2006.01)
*H04N 21/845* (2011.01)

(52) U.S. Cl.
CPC ..... *H04N 21/23439* (2013.01); *H04N 21/242* (2013.01); *H04N 21/266* (2013.01); *H04N 21/4307* (2013.01); *H04N 21/4622* (2013.01); *H04N 21/84* (2013.01); *H04N 21/812* (2013.01); *H04N 21/8455* (2013.01)

(58) Field of Classification Search
USPC .................................................. 707/638, 706
See application file for complete search history.

(56) References Cited

U.S. PATENT DOCUMENTS

| | | | |
|---|---|---|---|
| 7,823,056 B1 | 10/2010 | Davey et al. | |
| 7,881,657 B2 | 2/2011 | Wang et al. | |
| 7,933,870 B1* | 4/2011 | Webster | G06F 17/30174 707/638 |
| 8,341,412 B2 | 12/2012 | Conwell | |
| 8,656,435 B2 | 2/2014 | Ashby et al. | |
| 8,656,447 B2 | 2/2014 | Pasternak et al. | |
| 8,667,401 B1 | 3/2014 | Lozben | |
| 2002/0087569 A1* | 7/2002 | Fischer | H04N 21/235 707/999.1 |
| 2004/0073947 A1* | 4/2004 | Gupta | H04N 21/84 725/134 |
| 2004/0202235 A1* | 10/2004 | Kohli | G01C 21/26 375/150 |
| 2007/0277092 A1 | 11/2007 | Basson et al. | |
| 2008/0154908 A1* | 6/2008 | Datar | G06F 17/241 707/999.01 |
| 2008/0259211 A1 | 10/2008 | Kraft et al. | |
| 2008/0276234 A1* | 11/2008 | Taylor | G06F 8/60 717/177 |
| 2009/0094627 A1* | 4/2009 | Lee | H04N 21/252 725/9 |
| 2009/0213270 A1 | 8/2009 | Ismert et al. | |
| 2009/0265396 A1* | 10/2009 | Ram | G06F 17/30088 707/999.204 |
| 2010/0011392 A1* | 1/2010 | Bronstein | G06K 9/00758 725/28 |
| 2010/0100889 A1* | 4/2010 | Labrie | G06F 9/526 718/106 |
| 2012/0130952 A1* | 5/2012 | Kwon | G06Q 10/10 707/638 |
| 2012/0324491 A1* | 12/2012 | Bathiche | H04H 60/33 725/10 |
| 2013/0125000 A1* | 5/2013 | Fleischhauer | H04N 21/47205 715/723 |
| 2013/0204886 A1* | 8/2013 | Faith | G06F 17/30377 707/756 |
| 2013/0326082 A1 | 12/2013 | Stokking et al. | |
| 2015/0052102 A1* | 2/2015 | Nihal | H04N 21/84 707/610 |
| 2015/0193514 A1* | 7/2015 | Bradshaw | G06F 17/30174 707/638 |

OTHER PUBLICATIONS

"Digital Video Broadcasting (DVB); Specification for the Carriage of Synchronized Auxiliary Data in DVB Transport Streams," ETSI TS 102 823 v1.1.1 (European Telecommunications Standards Institute, Nov. 2005).

* cited by examiner

SYNCHRONIZING BROADCAST TIMELINE METADATA

FIELD OF THE INVENTION

The present invention generally relates to methods and systems for synchronizing broadcast timeline metadata.

BACKGROUND OF THE INVENTION

Pay TV users typically rarely watch the production media-content (i.e. information and experiences of value to an end-user/audience) in its original form, rather various instances of the original content is what most consumers typically view. The term "instance", in all of its grammatical forms, as used in the present specification and claims, refers to the version of the content with interleaved channel specific promotional material and advertisement patterns—that keeps changing time-to-time across regions and channels for the same content.

Multiple instances of the same content are broadcast and often re-broadcast on different channels or services (for example, and without limiting the generality of the foregoing, a "+1 channel", a catch-up service, and so forth) that can also be recorded to TV terminals such as set-top box, personal video recorders or over-the-top (OTT) enabled companion devices by the consumers.

Intra-content (timeline) metadata (i.e. metadata associated with a point in time inside the content) can be associated with any content, either automatically by analyzing the content in real time, or by aggregating real time feeds, like social feeds or 3rd party feeds, e.g. sports statistics during a live game.

A TV viewer may choose to watch an instance of content live from the broadcast or may decide to view it in a non-real time fashion, either offline (i.e. playback from DVR) or through an alternative on-line option (e.g., catch-up service, +1 channel or directly from content provider's portal). But in any of these cases the viewer typically would like to receive the same timeline metadata as if the viewer was watching the content during its original broadcast, when it is possible that timeline metadata will be gathered in quality and quantity. TV consumers need to have access to continuously growing timeline metadata of the content irrespective of whether the playback on their devices is from live broadcast or from personal video recorders.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A system, apparatus, and method for synchronizing timeline metadata associated with different instances of a content item is described. The system, apparatus, and method comprising a first content item having synchronization information, the first content item being a first instance of a reference content item, a candidate content item, which is a second instance of the reference content item, having synchronization information, a synchronizing processor which determines a synchronization point between the first content item and the candidate content item, on the basis of matching the synchronization information of the first content item and the candidate content item, a timeline metadata transmitter, which transmits stored timeline metadata to a device on which the first content item is playing, the transmission of the stored timeline metadata beginning from the synchronization point, wherein the stored timeline metadata comprises timeline metadata that has been previously aggregated from earlier broadcasts of instances of the reference content item. Related systems, apparatus, and methods are also described.

Exemplary Embodiment

Figure 1:
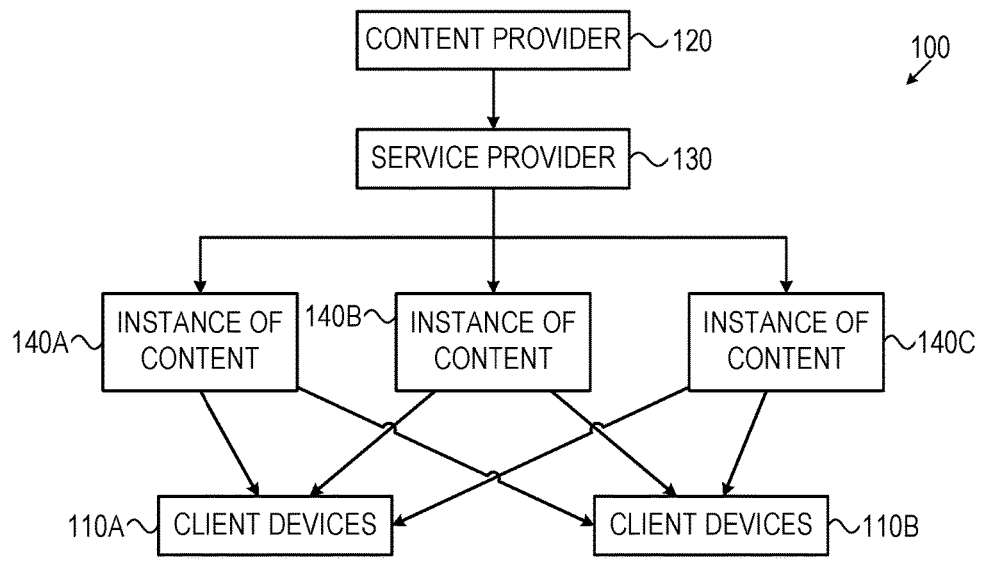
FIG. 1 is a simplified pictorial illustration of a system for content distribution, where different instances of a content item are distributed to various client devices, constructed and operative in accordance with an embodiment of the present invention.

Reference is now made to FIG. 1, which is a simplified pictorial illustration of a system 100 for content distribution, where different instances of a content item 140A, 140B, 140C are distributed to various client devices 110A, 110B, constructed and operative in accordance with an embodiment of the present invention. FIG. 1 depicts a typical pattern of flow of content (not depicted) from a content provider 120 to the client devices 110A, 110B. The content provider 120 comprises a person or organization which supplies the content itself for use on the client devices 110A, 110B. Typically, the content provider 120 provides the content to one or more service providers 130. The service provider 130 typically comprises a company that provides its subscribers access to the content. The service provider 130 might provide access to the content via a satellite broadcast, via cable, or over an IP-enabled connection. Additionally or alternatively, the service provider 130 might be providing content through a content distribution network, as is known in the art, or through multicast or unicast. All of the above mentioned methods of content distribution are referred to in the present specification as "broadcast".

For ease of discussion, the mechanisms and pathways used by the service provider 130 will be referred to hereinafter as "channels". The term is similar to broadcast television channels, but is meant to be inclusive of other mechanism, such as "over-the-top" content distribution pathways, broadcast distribution pathways, or other pathways known in the art by which content is distributed by content providers to the various client devices 110A, 110B.

Typically, several instances of content 140A, 140B, 140C might be prepared for delivery to the various client devices 110A, 110B. For example, and without limiting the generality of the foregoing, one instance of the content 140A may be prepared to be delivered via a channel which mainly serves consumers in the Spanish language, while a second instance of the identical content item 140B may be prepared to be delivered via a channel which mainly serves consumers in the English language. Alternatively, one instance of a content item may be prepared with a particular set of accompanying promotional material (i.e. promos) and advertisements, while a second instance of a content item may be prepared with a different set of promos and advertisements.

Figure 2:
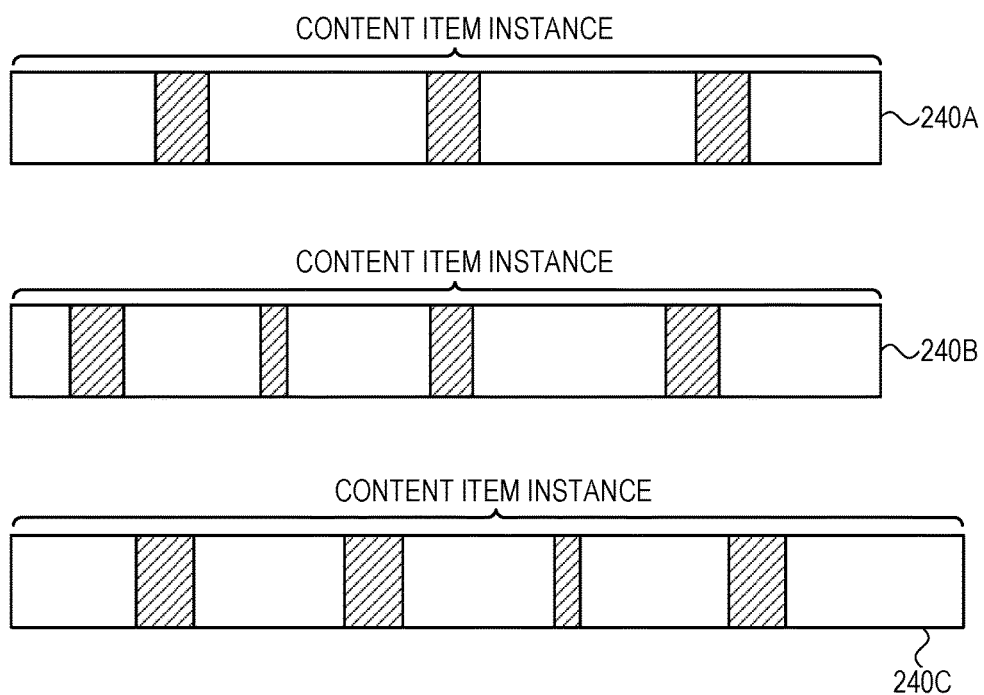
FIG. 2 is a depiction of three different instances of the content item from the system of FIG. 1, showing different ad patterns.

Reference is now made to FIG. 2, which is a depiction of three different instances of the content item from the system of FIG. 1, showing different ad patterns. Three different instances 240A, 240B and 240C of the content item are depicted, each represented as a rectangular block. Within each of the rectangular blocks there are differing ad patterns. An additional consideration is that because of its particular ad pattern, instance 240C is actually, in total, longer than corresponding instances 240A and 240B.

The ad patterns, as noted above, typically comprise a number of different elements: advertisements for specific products; channel specific promos; information about current reality shows; and so forth.

By way of example, a first instance 240A of a content item may be broadcast close to the time when the content item is relatively new. For example, a premier of a first episode of a new television mini-series will be broadcast once as a premier, may be re-broadcast an hour later on a +1 channel, and may still be available on various over-the-top services or channels within a week of the premier broadcast. As such, there will typically be a lot of social media related timeline metadata generated concerning the premier and the various repeats of the premier on +1 channels, OTT services, and so forth. Additionally, advertisements and promos in the ad patterns associated with the premier will be current, relating to the goods and services on sale at that time, or to current events and other current television programs.

By contrast, an instance of the same content item broadcast a year after the premier episode will typically generate little timeline metadata on social media networks. Advertisements and promos in the ad patterns associated with the broadcast a year later will also be current. However, because the content in the ad pattern of the rebroadcast will be current, the ad pattern will not match the content in the ad pattern from the premier.

It is appreciated, in view of the above discussions of FIGS. 1 and 2 that the content item 240A, 240B, 240C may be recorded on a storage element on the various client devices 110A, 110B (the storage element may comprise either fixed or removable storage), may be delivered over a broadcast network, may be delivered over the cloud, or over any other appropriate content delivery mechanism and/or network, as is known in the art.

Figure 3:
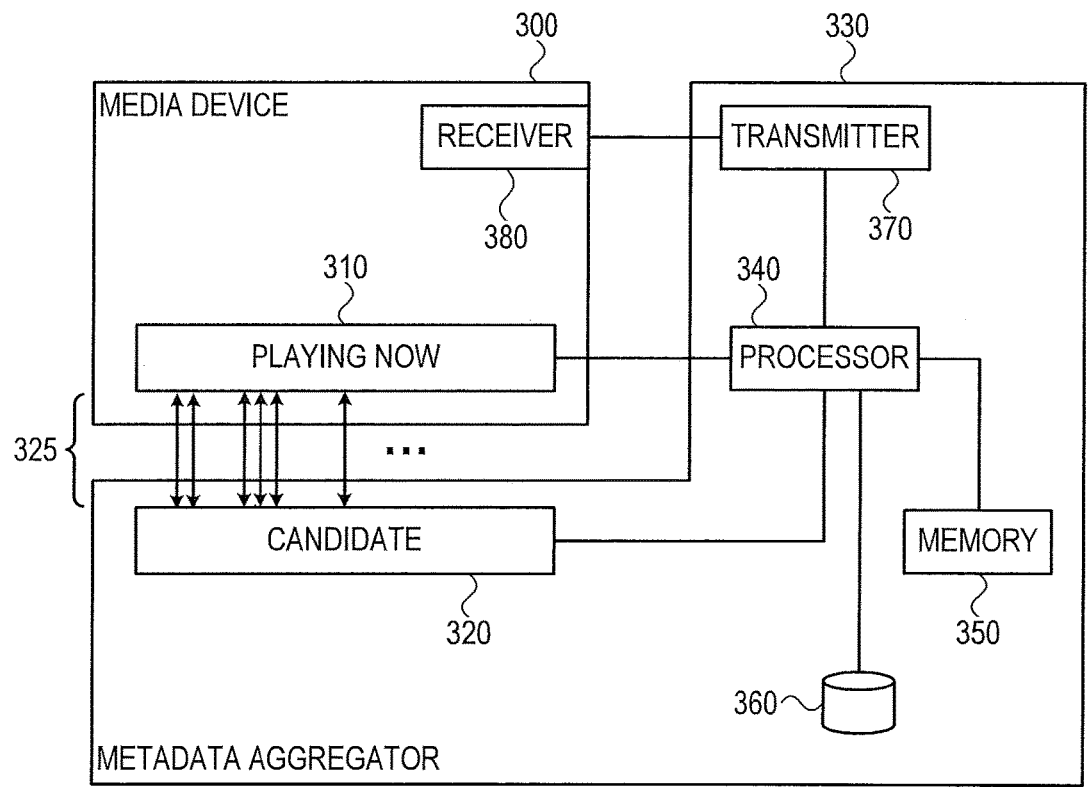
FIG. 3 is a block diagram depicting interaction of a client media device and a timeline metadata aggregator in the system of FIG. 1.

Reference is now made to FIG. 3, which is a block diagram depicting interaction of a client media device and a timeline metadata aggregator in the system of FIG. 1. A media device 300 is depicted with a content item having a playing content item 310, the content item being played at present on the media device 300, and hence is labeled as "Playing Now". Various points of broadcast timeline metadata in a candidate content item 320 are being compared 325. If a sufficient number of the broadcast timeline metadata points match, then the candidate content item 320 and the now playing content item 310 are deemed to be different instances of the same content item. Broadcast instances of a content item are typically different than corresponding DVD versions of the same content item in terms of interleaved promos, advertisements, and so forth, and it is likely that there may be scene-cuts (across various regions) which results in missing subtitles or video fingerprints. In such situations, percentage matches somewhere between 80-100% may be sufficient to conclude that the candidate item is a different instance of the same content. It is appreciated that the candidate content item 320 may be thought of as a reference content item for any other instances of the content item to which it is being compared as it is stored where the comparisons between the candidate content item 320 and the now playing content item 310 is affected.

The comparison is performed by a metadata aggregator and synchronization unit 330. More specifically, the metadata aggregator and synchronization unit 330 comprises at least one processor 340, and may comprise more than one processor 340. One of the processors 340 may be a special purpose processor operative to perform comparison and synchronization of the broadcast timeline metadata, according to the method described herein. In addition, the metadata aggregator and synchronization unit 330 comprises non-transitory computer-readable storage media (i.e. memory) 350. The memory 350 may store instructions, which at least one of the processors 340 may execute, in order to perform the method of timeline metadata comparison and synchronization described herein. Metadata aggregator and synchronization unit 330 also comprises storage 360. The storage 360 stores broadcast timeline metadata which has been previously aggregated from earlier broadcasts of various content items, the aggregated metadata being used for comparisons with candidate content items 320.

Metadata aggregator and synchronization unit 330 also comprises other typical and standard hardware and software components as are known in the art. Additionally, the metadata aggregator and synchronization unit 330 also comprises a transmitter 370 which, once processor 340 determines that the candidate content item 320 and the now playing content item 310 are different instances of the same content item, transmits stored broadcast content metadata from storage 360 to a receiver 380 comprised in the media device 300. The media device 300 is then able to make the received broadcast content metadata available to a user of the media device 300.

The metadata aggregator and synchronization unit 330 treats different instances of the same content as different entities and attempts to match against previously stored timeline metadata in real-time. This way the system synchronizes current broadcast instance with already archived content. The metadata aggregator and synchronization unit 330 is constantly comparing the metadata it is creating against already known timeline metadata to find potential matches. It continues comparing timeline metadata against the already matched stored content to gain a confidence measure that the matches are the same content—this is called the "lock-on mechanism".

It is appreciated that there are a variety of major sub-systems which have dedicated functionality in order to achieve the lock-on-mechanism. The first sub-system analyzes audio/video streams and generates primary/direct metadata (like subtitles, faces, audio-meter etc.). Next, based on these primary metadata types (either the same or a different) sub-system extracts secondary metadata (like scene/personality/object/place details, and so forth, as is known in the art). Ideally, this sub-system should not generate metadata if the metadata has been generated in the past—only the new candidate metadata gets appended to previously stored version. Furthermore, all of these timeline/intra-content metadata continuously get streamed in real-time into another sub-system which aggregates and archives them into storage (with pre-defined data-model). Various client devices get connected and request timeline metadata from this sub-system.

Once the lock-on mechanism determines that a sufficient confidence measure has been achieved and a lock has been acquired, the system has synchronized the original videos with the currently playing one and can provide additional timeline metadata from the matched content. The point in the content item from where the lock is acquired may be viewed as a "synchronization point". The currently playing content item may be considered an instance of a reference content item to which other content items may be compared.

It is appreciated that the technique of achieving a lock varies depending on the type of timeline metadata which has been used to achieve the lock. By way of example, in the case of subtitles, straight forward text match is used—out of <n> subsequent matches if the matches continue to be somewhere between 80-100% (say), the lock remains. If the percentage falls below 80%, the lock has to be acquired again—and the process continues. From then on, the system will keep checking that the lock is still correct—when the lock is lost, the process is restarted.

It is appreciated that the process of acquiring a lock is a continuous process that will build confidence overtime. As such, it is appropriate that the system not use a 100% threshold in order to cater to minor differences in the metadata that are artifacts of the extraction process, such as subtitles which may be a little bit different, a few letters or words not matching, and so forth. Also, issues known in the art which may be introduced when performing OCR (optical character recognition) of the received subtitles should also be allowed for. As such, an implementation decision may allow for the experience to give incorrect metadata for few seconds after lock has been lost (in reality) rather than cutting the metadata feed too early.

Figure 4:
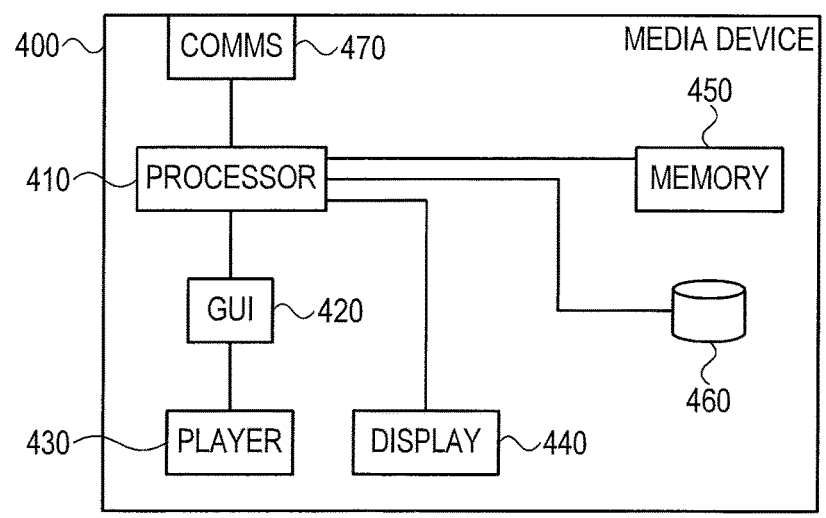
FIG. 4 is a block diagram depicting the client media device for use in the system of FIG. 1.

Reference is now made to FIG. 4, which is a block diagram depicting the client media device 400 for use in the system of FIG. 1. Typical implementations of the client media device 400 include, but are not limited to a tablet device, smartphone, desktop or portable computer, set-top box, Internet-enabled television, media center PC, or any other suitable device, such as is known in the art.

The client media device 400 comprises at least one processor 410, a user interface (typically a graphical user interface, GUI) 420, and a media player 430. The GUI 420 and the player 430 may comprise a single application, may be two applications which interact with each other, or the GUI may be part of a different application, such as a Web browser. The GUI 420 enables a user of the client media device 400 to interact with the player 430, request content, start, stop, and pause the player 430, and perform other well-known typical user interactions with the player 430. The player 430 typically outputs played media (i.e. content items) on a display 440, such as a screen.

The client media device 400 may comprise more than one processor 410. In addition, the client media device 400 comprises non-transitory computer-readable storage media (i.e. memory) 450. The memory 450 may store instructions, which at least one of the processors 410 may execute. Client media device 400 also comprises storage 460, on which, for example, the currently playing content item 310 (FIG. 3) is stored. The client media device 400 also comprises typical and standard hardware and software components as are known in the art.

The client media device 400 further comprises communications ports and drivers 470, included among them the receiver 380 (FIG. 3).

Figure 5:
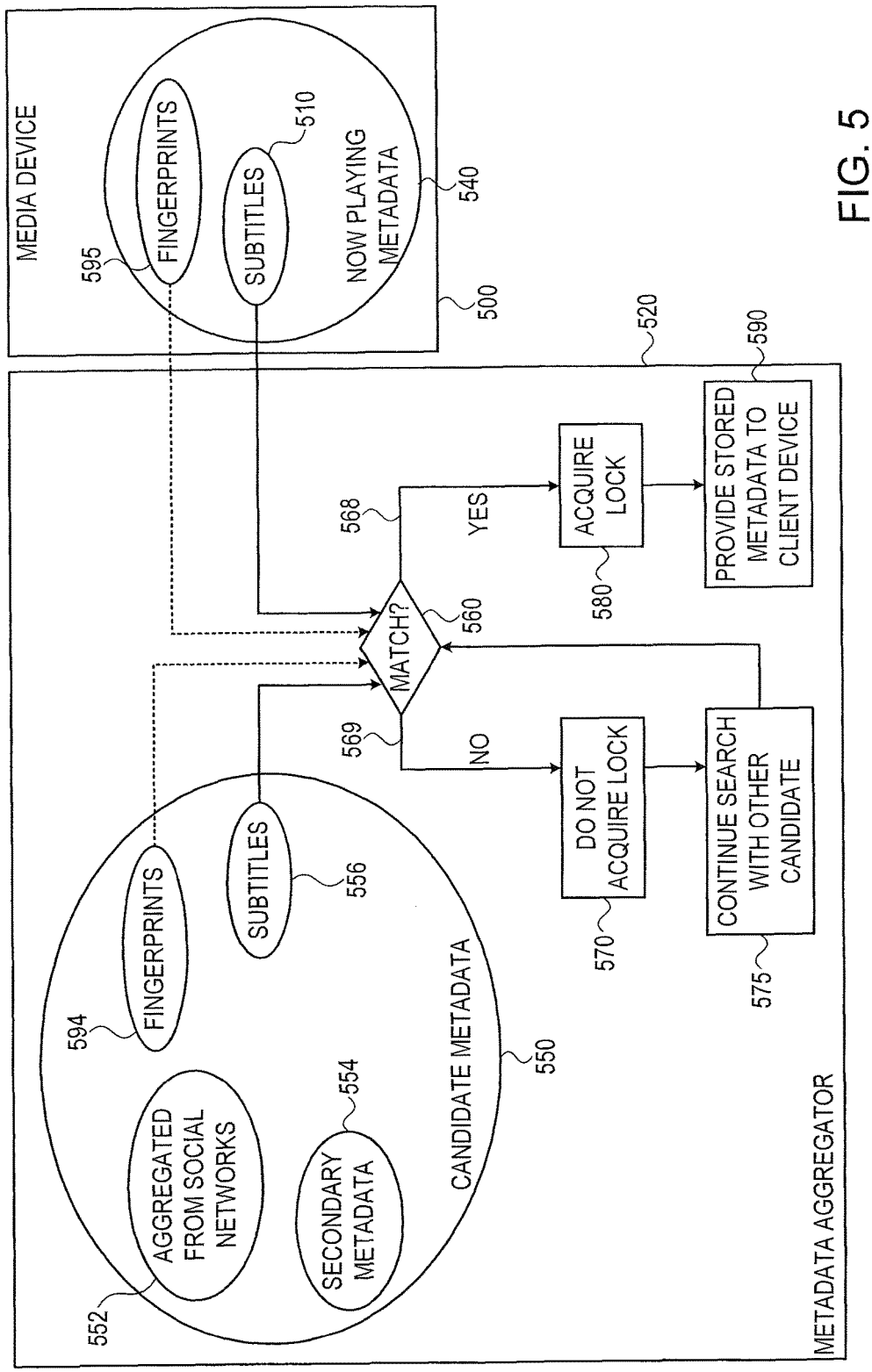
FIG. 5 is a partial Venn diagram, partial flowchart depiction of a lock-on mechanism as used in the system of FIG. 1.

Reference is now made to FIG. 5, which is a partial Venn diagram, partial flow chart depiction of a lock-on mechanism as used in the system of FIG. 1. By way of a non-limiting example illustrating the acquisition of the lock-on process described above, assume a scenario of a subscriber playback of an instance of a program recorded from a channel different than the one used by the metadata aggregator and synchronization unit 520 to perform content timeline metadata indexing.

A good candidate of timeline metadata to illustrate this scenario is the use of widely available subtitles in broadcast content. For example, a set top box (STB—media device) 500 is able to extract the subtitles 510 from its recorded content and provide them to the metadata aggregator and synchronization unit 520, which can then make use of them to acquire a lock on the previously stored content and can then provide the STB 500 with the other associated timeline metadata already stored—all synchronized with the video.

Expanding on this example, a set of timeline metadata, depicted as "now playing metadata" 540 is available to the STB 500, as timeline metadata which accompanies the now playing content item 310 (FIG. 3). Similarly, the candidate content item 320 (FIG. 3) of the metadata aggregator and synchronization unit 520 comprises its own accompanying timeline metadata 550, which may comprise metadata aggregated from social networks (or other Internet based sources) 552, secondary metadata (defined below) 554, and subtitles 556, as well as other types of timeline metadata (not depicted). The subtitles 510 from the STB 500 and the subtitles 556 from the candidate content item metadata are input into the processor 340 (FIG. 3), which determines if the two different sets of subtitles 510, 556 match or do not match (step 560).

It is appreciated that it is highly likely that there are other metadata items among the now playing metadata 540 besides the subtitles 510.

If the two different sets of subtitles 510, 556 do not match (step 560), then the system does not acquire a lock-on between the timelines of the candidate content item 320 (FIG. 3) and the now playing content item 310 (FIG. 3). Another candidate content item 320 is sought in the metadata aggregator and synchronization unit 520 database 360 (FIG. 3), and the process of determining if the two content items match or not (i.e. are or are not different instances of the same content item) repeats (step 560).

However, if Step 560 determines that the two different sets of subtitles 510, 556 do match (step 568) (i.e. are different instances of the same content item), then a lock-on between the two timelines is acquired (step 580). The metadata aggregator and synchronization unit 520 then provides timeline metadata which is associated with the candidate (now a confirmed match) content item 320 (FIG. 3) to the STB 500 (step 590).

There exists a possibility that both quality and quantity of the delivered timeline metadata vary across multiple playback of the same recording. This is because the metadata aggregator and synchronization unit 520 continuously keeps enriching the stored replica of the content with new set of available timeline metadata from various sources. It is appreciated that this is the reason that the candidate metadata Venn diagram 550 is depicted substantially larger than the now playing metadata Venn diagram 540.

An alternative method which may be used to establish the lock-on would be the use of video fingerprint technology at client device. The client device samples video at periodic interval (say every 3-5 seconds) and extracts a frame to compute video-fingerprint. These video-fingerprint/signatures are provided to the remote metadata aggregator and synchronization unit 520. The metadata aggregator and synchronization unit 520 make use of these received video-fingerprints to acquire a lock on the previously stored content and can then provide the client-device (like STB) with the other associated timeline metadata already stored—all synchronized with the video. Generally video fingerprinting technologies are resolution agnostic (to certain extent)—the client-devices (like STBs) which are limited in computation capabilities can sample the video with lower resolution to reduce computation overhead.

It is appreciated that there are other methods of acquiring lock-on. The methods described above are two examples of such methods.

It is also appreciated that the selection of a candidate content item 320 may depend on various factors. For example, if, upon examination of broadcast metadata it is determined that an instance of a content item has the same: title field, starring actors and directors (by way of example) as the now playing 310 (FIG. 3) content item, then the content item is deemed to be an appropriate candidate content item 320 (FIG. 3). On the other hand, if the various fields which may be used, for example, to populate a program guide about a content item do not match, then the instance of a content item having the different: title field, starring actors and directors (by way of example) as the now playing 310 (FIG. 3) content item, is most likely a different instance of the same content item. Therefore, the content item with non-matching program guide type fields would not be deemed a likely candidate content item 320 (FIG. 3).

The discussion of FIG. 5 above mentioned secondary metadata 554. One way of classifying the timeline metadata would be to differ between metadata which is immediately related to the content item. By way of example, if the subtitles mention New York City, then aside from the primary metadata of the subtitles, a Wikipedia article about New York City, various tourist websites about New York City, and so forth, may be collected by an off-line secondary metadata aggregator. When the reference to New York City occurs in the now playing content item 310 (FIG. 1), the timeline metadata will also have the collected secondary metadata which may then be presented to a user of the STB 500.

It is appreciated that the present invention does not rely on pre-added fingerprints to the audio/video for synchronization purposes but works on any content as it is distributed at the time of filing of this application. For example, fingerprinting 594, 595, as described above, performed on the content being rendered on media device 500, may be compared to aggregated fingerprints at the metadata aggregator and synchronization unit 520. The comparing of the fingerprints from the media device 500 and the metadata aggregator and synchronization unit 520 would then follow the procedure beginning with step 560, to determine if the two sets of fingerprints 594, 595 match or do not match.

The media device 500 may be configured to execute either one or both of the above processes, i.e. matching subtitles 510, 556 and/or fingerprints 594, 595. The lock-on mechanism may operate in a multi-modal manner. This provides a failsafe mechanism, so that if lock-on subtitles 510, 556 fails, fingerprint 594, 595 based lock may continue and vice-versa.

The lock-on failsafe mechanism described above is helpful in situations where subtitles 510, 556 are being extracted using OCR techniques either from DVB-subtitle streams or from video frame directly (because, for example, some regions do not have subtitles coming along with audio/video components for most of the channels).

Figure 6:
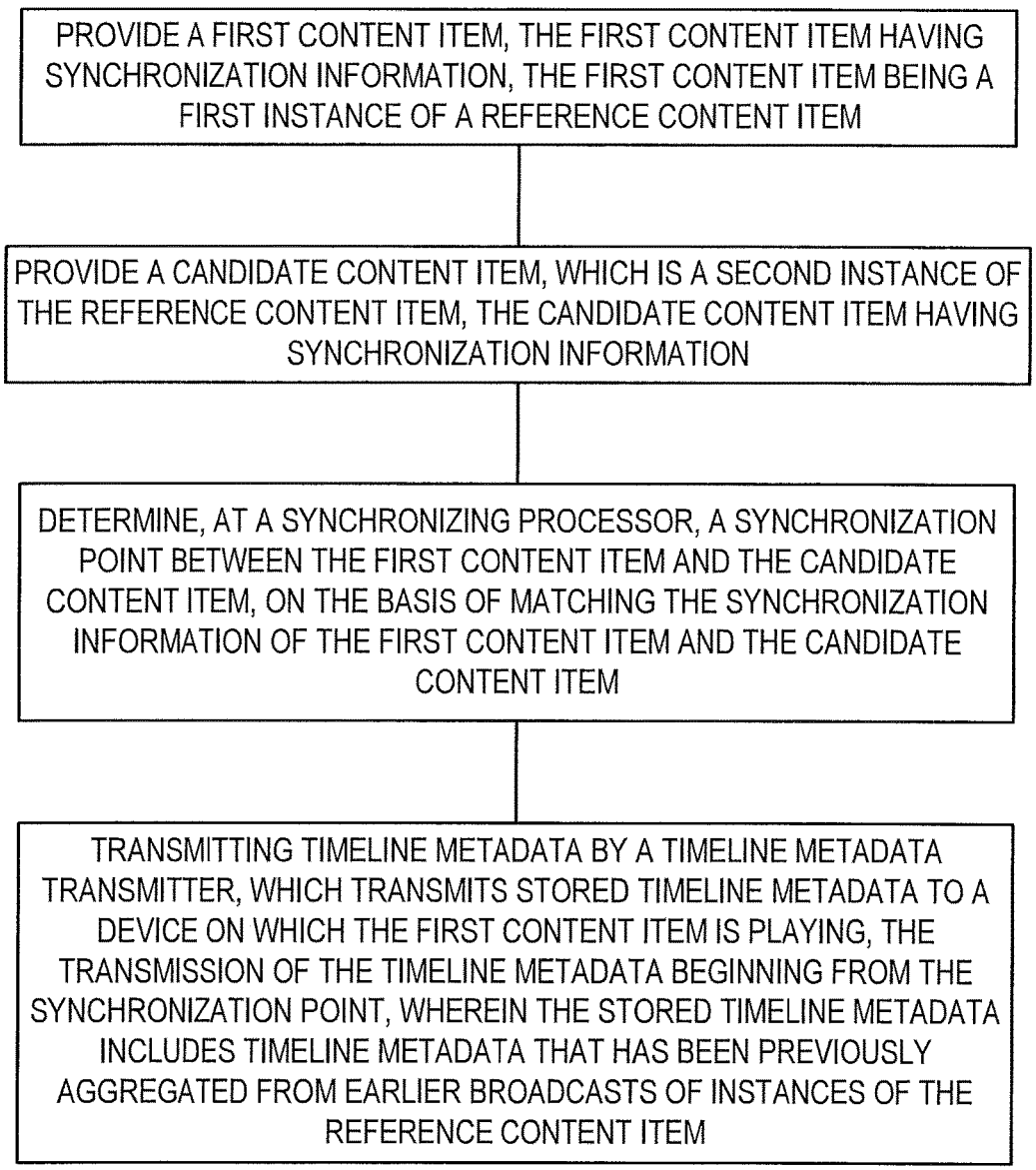
FIG. 6 is a simplified flowchart of a method of operation of the system of FIG. 1.

Reference is now made to FIG. 6, which is a simplified flowchart of a method of operation of the system of FIG. 1. The method of FIG. 8 is believed to be self-explanatory with reference to the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system for synchronizing timeline metadata associated with different instances of a content item, the system comprising:
    a first content item having timeline metadata, the first content item being a first instance of a reference content item;
    a candidate content item, which is a second instance of the reference content item, having timeline metadata;
    a synchronizing processor coupled to a memory, the synchronizing processor continually comparing the timeline metadata of the first content item and the timeline metadata of the candidate content item, the synchronizing processor comprising:
        a first sub-system which analyzes the first content item and the candidate content item for generating primary metadata;
        a second sub-system which extracts secondary metadata from the first content item and the candidate content item;
        a third sub-system which aggregates and archives in the memory the generated primary metadata and the extracted secondary metadata into timeline metadata; and
        a lock-on mechanism which determines a confidence measure that a lock has been acquired between the first content item and the candidate content item; and
    a timeline metadata transmitter, which transmits archived timeline metadata to a device on which the first content item is playing, the transmission of the archived timeline metadata beginning from a synchronization point, the synchronization point being the point in the first content item and the candidate content item at which the lock-on mechanism acquires the lock, the lock remaining until a value of the confidence measure falls beneath a threshold, wherein the archived timeline metadata further comprises timeline metadata that has been previously aggregated from earlier broadcasts of instances of the reference content item.

2. The system according to claim 1 wherein the primary metadata comprises a subset of the timeline metadata.

3. The system according to claim 1 wherein the primary metadata comprises subtitles.

4. The system according to claim 1 wherein the timeline metadata comprises a video fingerprint.

5. The system according to claim 1 wherein the timeline metadata comprises metadata aggregated from social networks.

6. The system according to claim 1 wherein the timeline metadata comprises secondary metadata.

7. The system according to claim 1 wherein the timeline metadata comprises subtitles.

8. The system according to claim 1 wherein the timeline metadata transmitter further comprises a metadata aggregator.

9. The system according to claim 8 wherein the metadata aggregator aggregates metadata available on the Internet.

10. The system according to claim 8 wherein the metadata aggregator aggregates metadata from a plurality of instances of the reference content item.

11. A method for synchronizing timeline metadata associated with different instances of a content item, the method comprising:
providing a first content item, the first content item having timeline metadata, the first content item being a first instance of a reference content item;
providing a candidate content item, which is a second instance of the reference content item, the candidate content item having timeline metadata;
continually comparing, at a synchronizing processor coupled to a memory, the timeline metadata of the first content item and the timeline metadata of the candidate content item, the comparing at the synchronizing processor comprising:
analyzing the first content item and the candidate content item at a first sub-system for generating primary metadata;
extracting secondary metadata from the first content item and the candidate content item at a second sub-system;
aggregating and archiving in the memory the generated primary metadata and the extracted secondary metadata into timeline metadata at a third sub-system; and
determining a confidence measure that a lock has been acquired between the first content item and the candidate content item; at a lock-on mechanism; and
transmitting timeline metadata by a timeline metadata transmitter, which transmits archived timeline metadata to a device on which the first content item is playing, the transmission of the archived timeline metadata beginning from a synchronization point, the synchronization point being the point in the first content item and the candidate content item at which the lock-on mechanism acquires the lock, the lock remaining until a value of the confidence measure falls beneath a threshold,
wherein the archived timeline metadata further comprises timeline metadata that has been previously aggregated from earlier broadcasts of instances of the reference content item.

12. The method according to claim 11 wherein the primary metadata comprises a subset of the timeline metadata.

13. The method according to claim 11 wherein the primary metadata comprises subtitles.

14. The method according to claim 11 wherein the timeline metadata comprises a video fingerprint.

15. The method according to claim 11 wherein the timeline metadata comprises metadata aggregated from social networks.

16. The method according to claim 11 wherein the timeline metadata comprises secondary metadata.

17. The method according to claim 11 wherein the timeline metadata comprises subtitles.

18. The method according to claim 11 wherein the timeline metadata transmitter further comprises a metadata aggregator.

19. The method according to claim 18 wherein the metadata aggregator aggregates metadata available on the Internet.

20. The method according to claim 18 wherein the metadata aggregator aggregates metadata from a plurality of instances of the reference content item.

* * * * *

UNITED STATES PATENT AND TRADEMARK OFFICE
CERTIFICATE OF CORRECTION

| | |
|---|---|
| PATENT NO. | : 9,832,538 B2 |
| APPLICATION NO. | : 14/445614 |
| DATED | : November 28, 2017 |
| INVENTOR(S) | : Laurent Bertrand et al. |

It is certified that error appears in the above-identified patent and that said Letters Patent is hereby corrected as shown below:

In the Specification

Column 2, Line 62, "140A. 140B. 140C" to read as -- 140A, 140B, 140C --.

Signed and Sealed this
Twenty-ninth Day of May, 2018

Andrei Iancu
*Director of the United States Patent and Trademark Office*